UNITED STATES PATENT OFFICE.

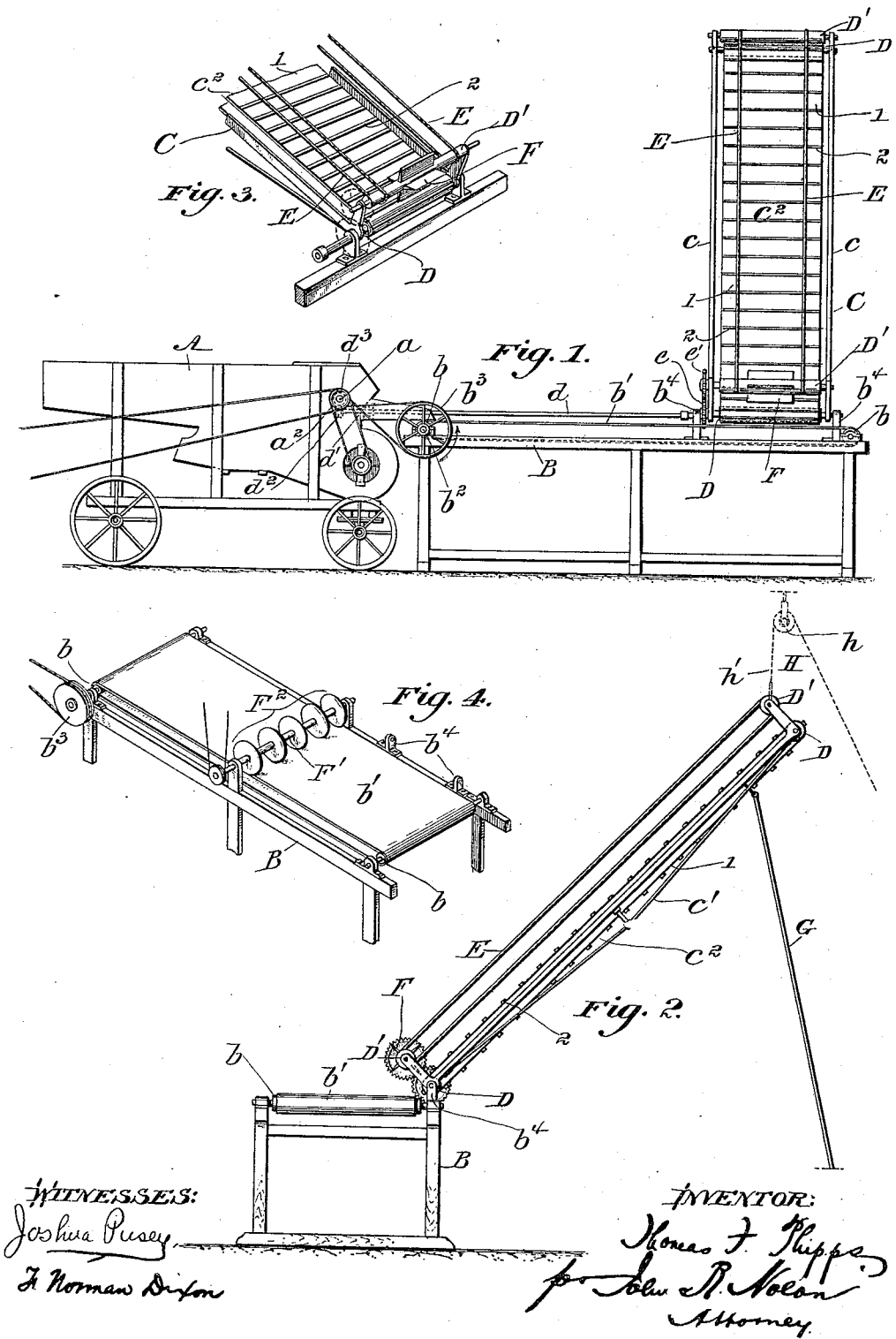

THOMAS F. PHIPPS, OF PHILADELPHIA, PENNSYLVANIA.

CONVEYER FOR THRASHING-MACHINES.

SPECIFICATION forming part of Letters Patent No. 450,420, dated April 14, 1891.

Application filed January 10, 1891. Serial No. 377,360. (No model.)

*To all whom it may concern:*

Be it known that I, THOMAS F. PHIPPS, a citizen of the United States, residing at Philadelphia, in the county of Philadelphia and State of Pennsylvania, have invented certain new and useful Improvements in Conveyers for Thrashing-Machines, of which the following is a full, clear, and exact description, reference being had to the accompanying drawings, of which—

Figure 1 is a side elevation of a thrashing-machine equipped with my invention. Fig. 2 is an end elevation of the conveying apparatus. Fig. 3 is a detail perspective view of the lower or inner end of the adjustable conveyer-frame and its adjuncts. Fig. 4 is a perspective of the horizontal carrier structure, showing the same provided with tie-cutting devices.

This invention relates to improvements in that class of conveying apparatus which is used more especially in connection with thrashing and analogous machines for the purpose of carrying and feeding to the latter from distant or elevated points sheaves or bundles of grain; and the invention accordingly consists in certain novel features of construction and combinations of parts, that will be hereinafter fully described, and definitely claimed.

Referring to the annexed drawings, A represents a thrashing-machine of any suitable construction, $a$ being the cylinder-shaft thereof, upon which is mounted the usual studded drum for acting upon the heads of grain. This shaft is driven by horse, steam, or other power in the usual way.

Disposed in close proximity to the rear of the machine is a substantial table or supporting-frame B, upon the respective ends of which are suitably journaled rollers $b$, around which passes an endless belt or carrier $b'$. Upon an extension $b^2$ of the shaft of one of these rollers is keyed a pulley $b^3$, to which motion is imparted from some suitable source of power, so as to rotate the roller in the direction of the adjacent arrow and perforce move the upper portion of the carrier toward the receiving end of the machine. Thus if a sheaf of grain be deposited upon this carrier the latter will convey the sheaf to the thrashing mechanism. In the present instance the pulley $b^3$ is belted with and driven from a similar pulley $a^2$ upon the cylinder-shaft of the thrashing-machine, as seen in Fig. 1.

The table B is provided toward its rear or outer end with two lateral brackets or lugs $b^4$, in and between which is pivoted one end of a frame C, of considerable length, which frame in this case comprises two stout parallel side members $c$, that are strengthened by means of the brace-rods $c'$. Journaled in and between these side members, at or near the extreme ends thereof, are two pairs of parallel rollers D D' and D D', respectively. Passing around the lower rollers D D, so as to extend from one to the other end of the frame C, is an endless apron $c^2$, the width of which is greater than the length of the longest sheaves to be transported to the thrashing-machine. I usually make the apron of an endless web 1 of canvas or other suitable flexible material, upon which is secured at intervals a series of transverse slats 2 for the better retention of the sheaves of grain upon the apron. The upper portion of this apron is adapted to travel in the direction of the lower carrier, so that if a sheaf of grain be delivered upon the outer end of the apron the latter will conduct the sheaf to the carrier, whereupon said carrier will feed the sheaf to the thrashing mechanism, as aforementioned. The apron may be impelled from such mechanism through the medium of the devices represented in the drawings—that is to say, the shaft of the lower roller D is provided with an extension $d$, the free end of which is supported in a suitable box $d'$ on the adjacent side of the thrasher. On this extension of the shaft is keyed a worm-wheel $d^2$, that is geared with a worm $d^3$, fast on the cylinder-shaft of the thrashing mechanism. By this construction it is evident that when said mechanism is in operation the apron $c^3$ is driven in concert therewith and with the feed-carrier $b'$.

The upper rollers D' D' at the opposite ends of the frame C are connected by means of two endless cords E, which pass around said rollers near their ends, respectively—that is, adjacent to the sides of the frame. These rollers are disposed at a sufficient distance above the lower rollers D D to allow the sheaves of grain to lie between the apron and the cords. The under portions of the latter are impelled in the same direction as the upper surface of the apron by means of the coacting gears $e$ $e'$ on the ends of the shafts of the lower pair of rollers D D, respectively. The cords, while acting in conjunction with the apron to transport the sheaves to the carrier $b'$, maintain the sheaves in position upon the apron and prevent their too hasty descent and consequent displacement. The sheaves at intervals are placed transversely upon the apron, with their heads toward the thrasher, so that when said sheaves are conveyed to the lower carrier the grain will be fed heads forward by the latter to the thrashing mechanism.

In order to provide for the cutting of the bands of the successive sheaves preparatory to their delivery to such mechanism, I usually equip the lower roller D with a series of radial knives F, which act upon and cut the bands of the sheaves as the latter are drawn into the bite of the rotating lower rollers D D.

As above stated, that end of the apron-bearing frame C adjacent to the table B is pivotally connected with the latter. Thus said frame, with its adjuncts, may be swung on the pivot to any incline or angle within proper limits, in order to bring the outer or free end of the frame into proper position with reference to the sheaves in the stack, irrespective of the height or position thereof. I ordinarily pivot at a suitable point upon the bottom of the swinging frame C a strong bar or prop G, the free end of which is adapted to enter or bear upon the earth, and thus support the frame in the desired position of adjustment. I sometimes use in lieu of this prop, or in addition thereto when desired, an appropriate hoisting-tackle H, the block $h$ of which is suspended from some suitable point of support, and the rope $h'$ of which is connected with one side of the frame C. When the latter has been adjusted, the free end of this rope may be fastened in any proper manner—by "belaying," for instance—so as to sustain the said frame in position; or, if desired, when the requisite adjustment has been effected through the use of the tackle the frame may be supported by the swinging prop G. This hoisting-tackle is very desirable where it can be conveniently applied, as it materially facilitates the raising and the lowering of the frame, &c.

I remark that instead of cutting the bands of the sheaves immediately before they are delivered upon the horizontal carrier I may sometimes effect this cutting after the sheaves have been delivered upon said carrier. In such case I shall dispense with the cutting-knives upon the lower or inner roller D, and shall mount at a proper point above the carrier within boxes or bearings rising from the sides of the table a transverse shaft $F''$, Fig. 4, provided with a series of circular knives $F^2$, which, if the shaft be rotated, will sever the bands of the successive sheaves as the latter are carried below the knives. The shaft $F'$ will be provided with a suitable driving-pulley, which may be belted with and driven from the thrashing mechanism in any way most convenient or desirable.

Although I have herein shown and described that which appears to be the best and most practicable embodiment of my invention, yet I do not confine myself to the special construction of parts disclosed, as the same may be variously modified without departing from the spirit of the invention.

Having thus described my invention, I claim as new and wish to secure by Letters Patent—

1. The combination, with the conveyer-frame, the belt or apron thereon, and its supporting-rollers, of the upper rollers, the cords or bands connecting the latter, and mechanism for concertedly actuating said cords or bands and the belt or apron, substantially as described.

2. The combination, with the conveyer-frame, the belt or apron thereon, and its supporting-rollers, of the upper rollers, the cords or bands connecting the same, and mechanism for impelling concertedly said cords or bands and the belt or apron, together with knives or cutters upon one of said rollers, substantially as described.

3. The combination, with thrashing or analogous mechanism, of a carrier mounted upon a suitable frame with reference to the receiving end of such mechanism, devices for impelling said carrier in concert with the latter, a frame extending laterally from said carrier-frame, a longitudinal belt or apron within said lateral frame, the supporting-rollers therefor, the upper rollers, the cords or bands connecting the latter, and mechanism for impelling said cords or bands and the belt or apron in concert with the thrashing or analogous mechanism, substantially as described.

4. The combination, with thrashing or analogous mechanism, of a carrier mounted upon a suitable frame with reference to the receiving end of such mechanism, devices for actuating said carrier in concert with the latter, a frame extending laterally from said carrier-frame, a longitudinal belt or apron within said lateral frame, the supporting-rollers therefor, the upper rollers, the cords or bands connecting the latter, the coacting gear-wheels on the ends of the lower or inner pair of rollers, and the shaft extending from one of said rollers and suitably geared with and actuated by the main driving-shaft of the thrashing or analogous mechanism, substantially as described.

In testimony whereof I have hereunto affixed my signature this 1st day of January, A. D. 1891.

THOMAS F. PHIPPS.

Witnesses:
JOHN R. NOLAN,
DAVID S. WILLIAMS.